Patented Dec. 14, 1948

2,455,931

UNITED STATES PATENT OFFICE 2,455,931

METHOD OF MAKING N-METHYL ANILINE

Everett C. Hughes, Cleveland Heights, Ohio, assignor to The Standard Oil Company, Cleveland, Ohio, a corporation of Ohio No Drawing. Application October 23, 1944,
Serial No. 560,042

2 Claims. (Cl. 260—577)

This invention relates to a process for making N-methyl aniline.

N-methyl aniline is a liquid having a relatively high boiling point (195.5° C.). It is relatively insoluble in water. It is a valuable intermediate in the manufacture of dyes and many other uses, and has the desirable property of raising the anti-knock value of motor fuel. It could be used in large quantities in producing aviation gasoline of a high knock rating, for example, if a simple and inexpensive method were available for producing it in large quantities, free from impurities which are less effective in raising knock rating.

The production of N-methyl aniline has been accomplished heretofore, among other processes, by the methylation of aniline. This process also yields substantial amounts of di-methyl aniline, and the mono and di-methylated products are difficult to separate. For example, N-methyl aniline has been prepared by heating aniline with methyl alcohol and hydrochloric acid in an autoclave.

It is an object of my invention to produce N-methyl aniline by a simple and efficient process, utilizing readily available raw materials to produce high yields per pass and by means of which any unreacted component or the catalyst may be recovered and reused.

Another object of the invention is to produce N-methyl aniline by a process which results in high yields with a minimum of secondary products or by-products which require separation and which decrease the value of the N-methyl aniline for raising the knock rating of motor fuel.

Another object of the process is to produce N-methyl aniline under conditions which are readily obtainable in a commercial operation and readily available in industrial equipment.

I have discovered that N-methyl aniline can be prepared by reacting mono-chlorobenzene with mono-methylamine in the presence of copper chloride as a catalyst. The process is easy to operate, efficient and gives yields of 95 to 100% per pass with a minimum of contaminates.

Chlorobenzene is readily available and can be prepared simply by chlorinating benzene. It is a liquid having a boiling point of 132.1° C. and is relatively insoluble in water. Methylamine is a gas having a boiling point of about −7° C. It is quite soluble in water and like all gases its solubility can be increased under pressure. The preferred catalyst, copper chloride, is soluble in the aqueous methyl amine, presumably forming a complex with the methylamine.

In practicing the process of the invention, either a continuous or batch operation may be employed. A continuous operation will probably be selected for a commercial embodiment, since it will permit more economic recovery and reuse of the catalyst and the unreacted ingredients. This recovery and reuse of the catalyst and the unreacted ingredients involves the employment of other inventions which are to be described in other applications. For ease of description, therefore, the process of this invention will be described primarily as applied to a batch operation. It may, however, be used in a continuous operation, as is pointed out above.

In carrying out the process, the mono-chlorobenzene is placed in a reactor together with water in which the methylamine and the cuprous chloride catalyst have been dissolved. The chlorobenzene, being relatively insoluble, in the aqueous solution, separates as a separate phase. The two phases can be intimately admixed with any appropriate agitating means. The reaction is continued under temperature and pressure conditions as indicated hereinafter, and is permitted to proceed for the desired length of time to obtain a good yield, as will be discussed hereinafter. The reaction may be viewed substantially as follows:

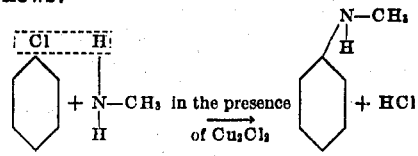

Inasmuch as an excess of the methylamine preferably is employed, the hydrochloric acid formed as a by-product will react with such an excess, in accordance with the following reaction:

At the conclusion of the reaction, the agitation may be discontinued and the reaction mixture will separate in two phases. Inasmuch as the reaction is generally carried out at an elevated temperature and pressure, in order that it may proceed to a good yield in a reasonable time, it is convenient to cool the mixture before the separation is accomplished.

One layer comprises the N-methyl aniline and any small amount of unreacted chlorobenzene. This layer may be withdrawn and subjected to fractional distillation. Any unreacted chlorobenzene will be readily separated from the N-methyl aniline because of their wide difference in boiling point. The recovered chlorobenzene can be recharged to the reaction zone.

The other layer comprises an aqueous phase containing the unreacted methylamine, the methylamine hydrochloride by-product and the copper chloride catalyst. This layer may be reprocessed to neutralize the methylamine hydrochloride and the recovered methylamine may be reused. The catalyst may also be recovered and reused.

In general the lower layer is the aqueous phase, but it is possible for the lower layer to be the nonaqueous phase in the case of low catalyst concentration and low conversion.

The temperature selected for the reaction preferably should be such that the reaction proceeds at a rate so that good yields may be obtained in a reasonable time. In general, the temperature should be about 100 to 300° C.; the preferred range being about 150 to 250° C. and within this range a temperature of 215° to 235° C. seems to be optimum when the other variables are optimum. Too high temperatures are to be avoided as they tend to introduce side reactions.

The pressure employed is sufficient to keep the material in the liquid phase at this temperature. Higher pressures may be used but with no material advantage. This suggests the desirability of not employing any higher pressure than is necessary to maintain a liquid phase operation. Pressures within the range of 200 to 1500 pounds per square inch have been observed.

The proportion of the various ingredients for optimum yields may vary considerably. The amount of the catalyst may be expressed conveniently in relation to the methylamine since these are both contained in the same aqueous phase. The ratio of the cuprous chloride catalyst to the methylamine may be from 0.01 to 1.0, expressed as copper (atomic)/methylamine (mol). With larger amounts of catalyst it is possible to utilize somewhat lower temperatures and shorter reaction times and this suggests the use of a large amount. Generally, a ratio of 0.1 to not over 0.4 is desirable. There is some evidence that the conversion of chlorobenzene per pass falls off somewhat if the amount of the catalyst is too large. Since the recovery and reuse of the catalyst presents certain problems, this also suggests the use of a minimum amount. The amount to be selected in a commercial embodiment will be within the above ranges and will be related largely to the other variables of the process and the facilities for recovering and reusing the catalyst.

The ratio of the methylamine to the chlorobenzene is such as to have a substantial excess of the methylamine, since this removes the hydrochloric acid by-product, the formation of which slows the reaction. Stoichiometric considerations indicate that at least 2 mols of methylamine should be used for each mol of chlorobenzene. There is probably no upper limit except the objection to recycling the excess. An upper limit of 10 mols is reasonable in a commercial operation. In a continuous process, there is no particular objection to having the large excess, since this can be recycled and does not involve any economic loss.

The reaction time should be adjusted with reference to the other variables and should be such as to obtain as high a yield as possible. Under the optimum conditions of the other variables good yields can be obtained in a reaction time as small as 10 minutes, but preferably the reaction time is from one-half to one hour. With increased amounts of catalyst, optimum proportions and at the higher temperatures, the reaction time can be made very short.

The concentration of the methylamine in the aqueous phase is more or less critical and has an important effect upon the yield of the N-methyl aniline, especially when the minimum reaction time is used as it would be in a continuous commercial operation. The preferred concentration is 40 to 75% methylamine based on the total aqueous phase. It is interesting to note that at concentrations above 90%, the yields fall off markedly, contrary to what may be expected. Similarly, concentrations below 20% result in markedly lower yields. The optimum concentration appears to be about 60%, and the conversion per pass falls off on either side of this figure unless much longer reaction times are used. It is very desirable to obtain optimum conversion per pass in a minimum time as this increases the net amount of the N-methyl aniline that can be made with equipment of a given capacity. This effect of the concentration of methylamine is quite unexpected since the literature states that the concentration of ammonia in the amination of chlorobenzene has no affect on the rate of the reaction when ammonia is employed. This indicates that the use of methylamine presents special problems, and that it is probably unique in interfering in some way with the action of the particular catalyst employed in the aqueous phase in the process.

Operating under the conditions above described yields of 75% or above are obtained and optimum conditions give yields as high as 95%.

As indicative of the yields that may be obtained in accordance with the invention, 450 parts by weight of a 40% aqueous solution of methylamine containing 92 parts by weight of cuprous chloride was charged into a stirred reactor. This amount to 0.16 mol of catalyst (expressed as copper) per mol of methylamine; 130 parts by weight of chlorobenzene was then charged to the reactor. The molal ratio of methylamine to chlorobenzene is 5:1. These are within the ranges heretofore described.

The reaction mixture is agitated for 30 minutes while the temperature is maintained at 215 to 225° C. The reaction is in a closed vessel and under the pressure developed at this temperature which keeps the ingredients in the liquid phase. At the end of this reaction time, the mixture was rapidly forced out of the reactor and discharged through an efficient condenser where it was cooled and then sent to a stratifying vessel. The nonaqueous layer was drawn off and upon analysis it was found to contain 7% unreacted chlorobenzene and 93% N-methyl aniline. Although in this example the methylamine concentration was less than the optimum value for economic reasons, nevertheless the yield was exceptionally high.

As illustrative of an additional example in which the methylamine concentration was maintained at the optimum value but the amount of catalyst was exceptionally small in order to minimize the problems incident to the recovery thereof, 5 mols of a 60% aqueous solution of methylamine containing 0.04 mol of $Cu_2Cl_2$ per mol of methylamine was reacted for one-half hour at a temperature of 200 to 230° C. with 1 mol of chlorobenzene. The procedure in general was that described in the previous example and the conversion of chlorobenzene to N-methyl aniline was 75% per pass.

In the above description a preference for copper chloride as the catalyst has been indicated. This may be either $Cu_2Cl_2$ or $CuCl_2$ which are about of equal effectiveness as starting materials. The copper chloride may shift from the cuprous to the cupric state and vice versa depending on the conditions of the reaction.

It is obvious that my invention may be practiced by variations in the conditions and other factors indicated heretofore and I intend all of the same to be included within the invention as filed within the scope of the following claims.

I claim:

1. The method of making N-methyl aniline which comprises agitating mono-chlorobenzene with an aqueous phase containing 40 to 75% mono-methylamine and a catalyst comprising a copper chloride.

2. The method of making N-methyl aniline which comprises agitating an aqueous phase containing about 60% mono-methylamine and a catalyst comprising copper chloride with a non-aqueous phase comprising a mono-chlorobenzene in an amount to provide not more than one-half mol of mono-chlorobenzene per mol of mono-methylamine, at a temperature of 150 to 250° C. and a pressure to maintain the reaction ingredients in the liquid phase, continuing the reaction for not over 1 hour, cooling the reaction mixture, separating the aqueous and non-aqueous phases, and separating the N-methyl aniline from the non-aqueous phase, whereby an at least 75% conversion of the chlorobenzene to N-methyl aniline is obtained.

EVERETT C. HUGHES.

REFERENCES CITED

The following references are of record in the file of this patent:

UNITED STATES PATENTS

| Number | Name | Date |
|---|---|---|
| 1,921,726 | Britton | Aug. 8, 1933 |
| 1,932,518 | Hale | Oct. 31, 1933 |
| 1,935,515 | Mills | Nov. 14, 1933 |
| 2,212,825 | Daudt | Aug. 27, 1940 |

OTHER REFERENCES

Marcinkow et al., "Roczniki Chemie," vol. 16, pages 395–402 (1936).

Chem. Abstracts, vol. 31 (1937), page 1776.

Groggins: "Unit Processes in Organic Synthesis" (1938), p. 299.